US011788671B2

(12) United States Patent  (10) Patent No.: US 11,788,671 B2
Huang et al.  (45) Date of Patent: Oct. 17, 2023

(54) SUPPORTING DEVICE

(71) Applicant: SYNCMOLD ENTERPRISE CORP., New Taipei (TW)

(72) Inventors: Chun-Hao Huang, New Taipei (TW); Chien-Wei Cheng, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 22 days.

(21) Appl. No.: 17/646,346

(22) Filed: Dec. 29, 2021

(65) Prior Publication Data

US 2022/0228697 A1 Jul. 21, 2022

Related U.S. Application Data

(60) Provisional application No. 63/138,981, filed on Jan. 19, 2021.

(30) Foreign Application Priority Data

Oct. 14, 2021 (TW) .................. 110212048

(51) Int. Cl.
*F16M 11/06* (2006.01)
*F16M 11/04* (2006.01)
*F16M 11/10* (2006.01)
*F16M 11/24* (2006.01)
(Continued)

(52) U.S. Cl.
CPC .......... *F16M 11/041* (2013.01); *F16M 11/06* (2013.01); *F16M 11/10* (2013.01); *F16M 11/125* (2013.01); *F16M 11/24* (2013.01); *F16M 11/22* (2013.01); *F16M 2200/022* (2013.01); *F16M 2200/024* (2013.01); *F16M 2200/027* (2013.01); *F16M 2200/041* (2013.01)

(58) Field of Classification Search
CPC .... F16M 2200/06; F16M 11/06; F16M 11/10; F16M 2200/04; F16M 2200/041; A47B 97/001; F16B 21/06; F16B 21/065; F16B 21/08; Y10S 403/04; Y10T 403/7073
USPC ............ 248/220.21, 220.22, 221.11, 221.12, 248/222.11, 222.12, 223.41, 224.51, 248/224.61, 224.8, 222.41, 225.11, 248/123.11, 123.2, 122.1, 125.9, 133, 248/139, 371, 162.1, 404, 406.2, 919, 248/920, 921, 922, 923
See application file for complete search history.

(56) References Cited

U.S. PATENT DOCUMENTS

| 8,083,193 | B2 * | 12/2011 | Matsui | F16M 11/041 248/222.51 |
| 2008/0237411 | A1 * | 10/2008 | Kim | F16M 11/046 248/122.1 |
| 2017/0051865 | A1 * | 2/2017 | Chen | F16M 11/046 |

(Continued)

FOREIGN PATENT DOCUMENTS

CN 212617111 U 2/2021

*Primary Examiner* — Alfred J Wujciak
(74) *Attorney, Agent, or Firm* — Osha Bergman Watanabe & Burton LLP (57) ABSTRACT

A supporting device for carrying a display is provided and includes: a support upright; a protruding neck provided on the support upright; and a carrying board unit being able to be detachably arranged on the protruding neck and used for carrying the display. The carrying board unit includes a quick-release fixing member detachably arranged on the protruding neck.

19 Claims, 9 Drawing Sheets

(51) Int. Cl.
*F16M 11/12* (2006.01)
*F16M 11/22* (2006.01)

(56) References Cited

U.S. PATENT DOCUMENTS

| | | | |
|---|---|---|---|
| 2018/0187822 A1* | 7/2018 | Yen | F16M 13/022 |
| 2020/0229314 A1* | 7/2020 | Chen | H05K 5/0234 |
| 2021/0156507 A1* | 5/2021 | Huang | F16M 11/10 |

* cited by examiner

SUPPORTING DEVICE

CROSS-REFERENCE TO RELATED APPLICATION

This application claims the benefit of U.S. Provisional Application Ser. No. 63/138,981 filed on Jan. 19, 2021, and the benefit of Taiwan Patent Application Serial No. 110212048 filed on Oct. 14, 2021. The entirety of each Application is incorporated herein by reference.

BACKGROUND

1. Technical Field

The present disclosure relates to a supporting device, and more particularly, to a supporting device with a quick-release function.

2. Description of Related Art

The China Patent No. CN212617111U discloses a sinking double-rotation mechanism and a screen including the mechanism, which integrates the functions of rotation and tilting forward and backward, is mounted on a stand body (not shown in the figure), and includes a screen, a fixing component, a pivoting component and a plastic cover. One side of the fixing component is provided with a circular cavity and connected to the screen. The pivoting component includes a movable plate and a pivoting block. The pivoting block pivotally connects to the movable plate, the movable plate is immersed in the circular cavity, and the pivoting block protrudes outward to be exposed outside the circular cavity. The plastic cover is used to cover the circular cavity and has a body, an elastic hook and an elastic member. The elastic hook is arranged on the body, and the elastic member is passing through the elastic hook. The stand body includes a column and a chassis for arranging the column.

Although such design has achieved an effective reduction in a volume of a pivot assembly, since only the chassis and the column are separated (assembled by the user) at the time of shipment, the fixing component and the pivoting component are already assembled on the column of the stand body, the volume of the packaging material required is still very large, such that the cost of the packaging material cannot be effectively reduced.

In view of this, the present disclosure provides another supporting device with a quick-release function, such that a fixing component and a pivoting component can be quickly and detachably arranged, and the fixing component and the pivoting component can be separated from each other when shipped, thereby reducing the volume and cost of packaging materials.

SUMMARY

In view of the aforementioned problems of the prior art, the present disclosure provides a supporting device for carrying a display on a working surface, the supporting device comprises: a support upright disposed on the working surface and including a column and an opening, wherein the column substantially extends along a gravity direction, and the opening is formed on the column; a protruding neck disposed on the column and partially extending from the opening along a first axis; and a carrying board unit being able to be detachably arranged on the protruding neck and used for carrying the display, wherein the carrying board unit includes a quick-release fixing member being able to be fixed on the protruding neck.

In the aforementioned supporting device, the supporting device further comprises a first pre-component and a second pre-component, wherein the first pre-component is disposed on one of the protruding neck and the carrying board unit, and the second pre-component is disposed on the other one of the protruding neck and the carrying board unit and is able to be removably matched with and connected to the first pre-component.

In the aforementioned supporting device, the first pre-component and the second pre-component are hung on each other by gravity.

In the aforementioned supporting device, the first pre-component includes a hanging ear, the second pre-component includes a hanging hook, and the hanging ear is able to be hung on the hanging hook.

In the aforementioned supporting device, the hanging ear has an ear groove and an ear pinna, and the ear pinna surrounds and defines the ear groove.

In the aforementioned supporting device, the hanging ear further has a positioning groove formed on the ear pinna and intercommunicating with the ear groove, wherein the hanging hook has an extension portion and a hook portion, and wherein when the first pre-component and the second pre-component are matched and connected, the extension portion is accommodated in the ear groove, and the hook portion is accommodated in the positioning groove.

In the aforementioned supporting device, the first pre-component further includes a slot and a body, one end of the body is connected to the ear pinna, and the slot is formed at the other end of the body, and wherein the second pre-component further includes a snap hook being able to be accommodated in the slot and engaged with the body.

In the aforementioned supporting device, when the first pre-component and the second pre-component are matched and connected, the positioning groove extends substantially along the gravity direction, the ear groove and the extension portion substantially extend along the first axis, and the hook portion is connected to the extension portion and extends substantially along the gravity direction.

In the aforementioned supporting device, the body has an abutting surface, and the second pre-component further includes a contacting surface, and wherein when the first pre-component and the second pre-component are matched and connected, the abutting surface and the contacting surface are attached.

In the aforementioned supporting device, the hanging hook and the snap hook are disposed on the contacting surface at intervals, and the ear groove and the slot are disposed at intervals, and wherein when the first pre-component and the second pre-component are matched and connected, the hanging hook and the snap hook are arranged along the gravity direction, and the ear groove and the slot are arranged along the gravity direction.

In the aforementioned supporting device, the body further has a buckling block, wherein the snap hook has an extension section and a hook section connected to each other, and wherein the extension section is able to be accommodated in the slot, and the hook section is able to be buckled with the buckling block.

In the aforementioned supporting device, the slot has a main slot body and an extended slot body intercommunicated with each other, and wherein the main slot body is formed on the body along the gravity direction, the extension section is able to be accommodated in the extended slot body, and the hook section is able to extend into the main slot body and abut against the buckling block.

In the aforementioned supporting device, the buckling block has two protrusions and a stop inner surface, the extension section has a convex rib and two wing plates, the wing plates respectively extend outward from the convex rib, and wherein when the first pre-component and the second pre-component are matched and connected, the hook section abuts against the stop inner surface, the convex rib is accommodated in the extended slot body and located between the protrusions, and the wing plates respectively and correspondingly abut against the protrusions.

In the aforementioned supporting device, the buckling block has an inverted U-shaped cross-section, and the extension section has an inverted T-shaped cross-section.

In the aforementioned supporting device, the quick-release fixing member includes a screw head and a screw rod connected to each other, wherein the protruding neck has a screw hole, the first pre-component further includes a through hole extending along the first axis, and wherein when the first pre-component and the second pre-component are matched and connected, the screw rod is able to be screwed into the screw hole by passing through the carrying board unit and the through hole, and the screw head abuts against the first pre-component, such that the carrying board unit is able to be quickly and detachably arranged on the protruding neck.

In the aforementioned supporting device, the carrying board unit includes a rod member arranged along a second axis perpendicular to the gravity direction and the first axis, wherein the rod member has a penetrating hole penetrating along the first axis, intercommunicating with the through hole and allowing the screw rod to pass through, and wherein the first pre-component further includes a fixing hole extending along the second axis, intercommunicating with the through hole and allowing the rod member to pass through.

In the aforementioned supporting device, the carrying board unit further includes a carrying board and a tilting module, wherein the carrying board is used to connect to the display and has an accommodating space, and the rod member and the tilting module are arranged in the accommodating space, and wherein when the first pre-component and the second pre-component are matched and connected and when the quick-release fixing member is fixed to the protruding neck, the carrying board is able to rotate relative to the column about a third axis, the display is able to be switched between a portrait position and a landscape position, and the carrying board is also able to be tilted relative to the column about the second axis and change an inclination angle of the display.

DETAILED DESCRIPTIONS

Figure 1:
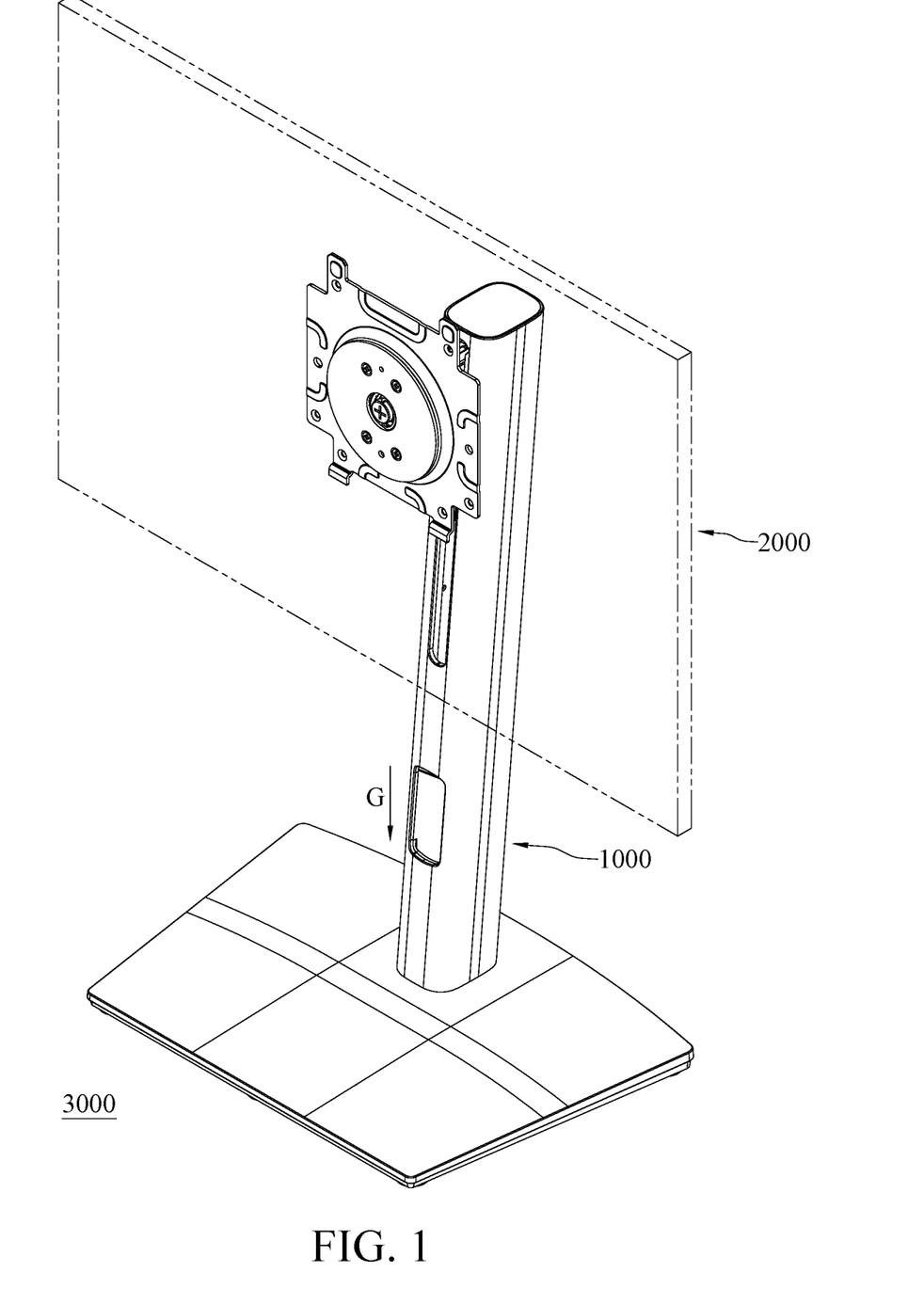
FIG. 1 is a schematic overall view of a supporting device according to the present disclosure.
Figure 2:
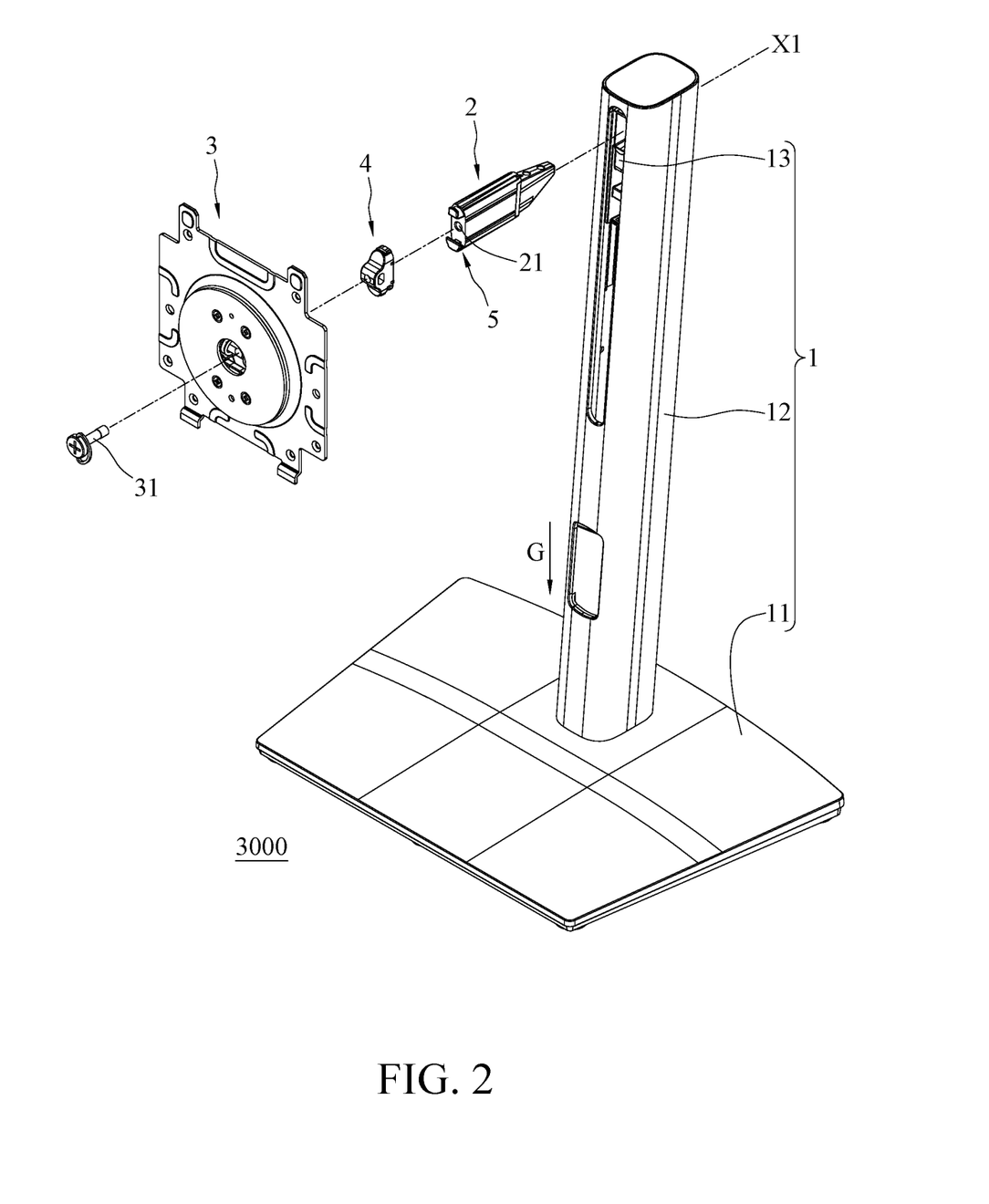
FIG. 2 is a schematic exploded view of the supporting device according to the present disclosure.

Please refer to FIGS. 1 and 2. A supporting device 1000 according to the present disclosure is used to carry a display 2000 on a working surface 3000. The supporting device 1000 includes a support upright 1, a protruding neck 2, a carrying board unit 3, a first pre-component 4 and a second pre-component 5, wherein the support upright 1 is arranged on the working surface 3000 (for example, a desktop), the protruding neck 2 is penetrating through the support upright 1, and the carrying board unit 3 is provided on the protruding neck 2 in a manner that can be quickly and detachably arranged and used for carrying the display 2000. The first pre-component 4 is fixed on the carrying board unit 3, and the second pre-component 5 is fixed on the protruding neck 2 and removably matched with and connected to the first pre-component 4. The structure of each element and the connection relationship between each element are described in detail below, wherein some of the drawings show a gravity direction G.

The support upright 1 includes a chassis 11, a column 12 (e.g., an upright column), and an opening 13. The chassis 11 is roughly a trapezoidal board body placed on the working surface 3000, but it is not limited to this, and can also be in a form of clamping a tabletop or fixing on a wall. The column 12 extends substantially along the gravity direction G and one end of the column 12 is disposed on the chassis 11, and the opening 13 is formed on the column 12. In the embodiment, the column 12 extends in a manner of slightly inclined to the working surface 3000. In other embodiments, the column 12 may also be extended in a manner of perpendicular to the working surface 3000, but it is not limited to this.

The protruding neck 2 is disposed on the column 12, partially extended from the opening 13 along a first axis X1, exposed to the column 12, and has a screw hole 21 formed along the first axis X1, wherein the first axis X1 is free from being parallel to the gravity direction G. In addition, the protruding neck 2 according to the present disclosure is an example of a fixed type, but the protruding neck 2 can also be a sliding type (for example, a slider that can slide back and forth substantially parallel to the gravity direction G).

Figure 3:
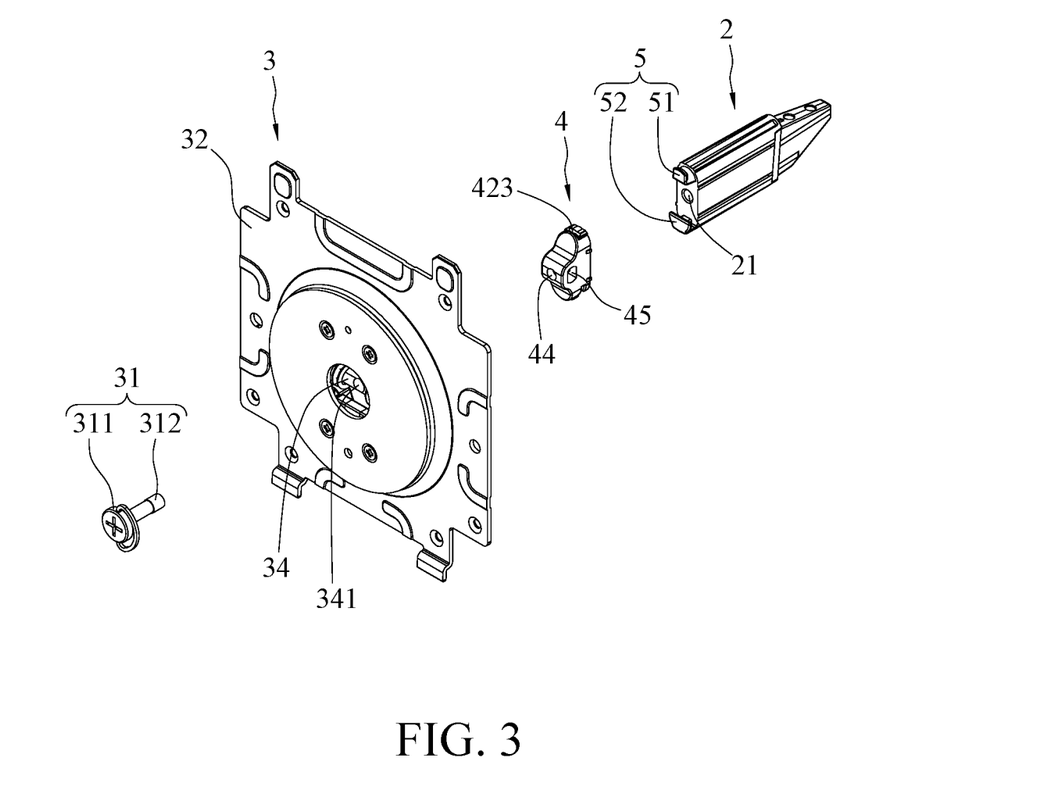
FIGS. 3 and 4 are respectively schematic exploded views of different viewing angles of some elements of the supporting device according to the present disclosure.
Figure 4:
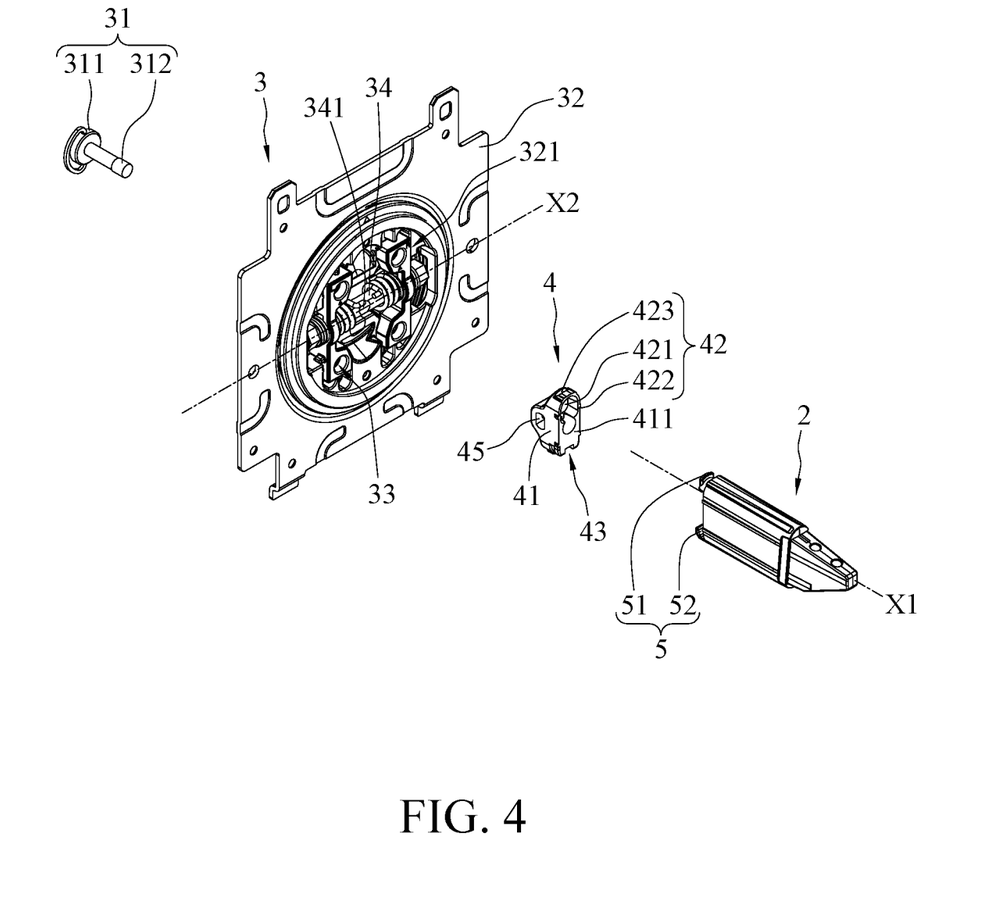

Please refer to FIG. 3 and FIG. 4. The carrying board unit 3 includes a quick-release fixing member 31, a carrying board 32, a tilting module 33 and a rod member 34. The quick-release fixing member 31 has a screw head 311 and a screw rod 312 that are connected to each other to be detachably screwed to the screw hole 21. In an embodiment, the quick-release fixing member 31 is a quick-release screw, but not limited to this. The carrying board 32 is used for connecting to the display 2000 and has an accommodating space 321, and the tilting module 33 is disposed in the accommodating space 321 and can be tilted together with the carrying board 32. A second axis X2 is perpendicular to the gravity direction G and the first axis X1. The rod member 34 is disposed in the accommodating space 321 along the second axis X2 and penetrates through the tilting module 33, and has a penetrating hole 341 penetrating along the first axis X1. In the embodiment, the rod member 34 is a flat shape.

Figure 5A:
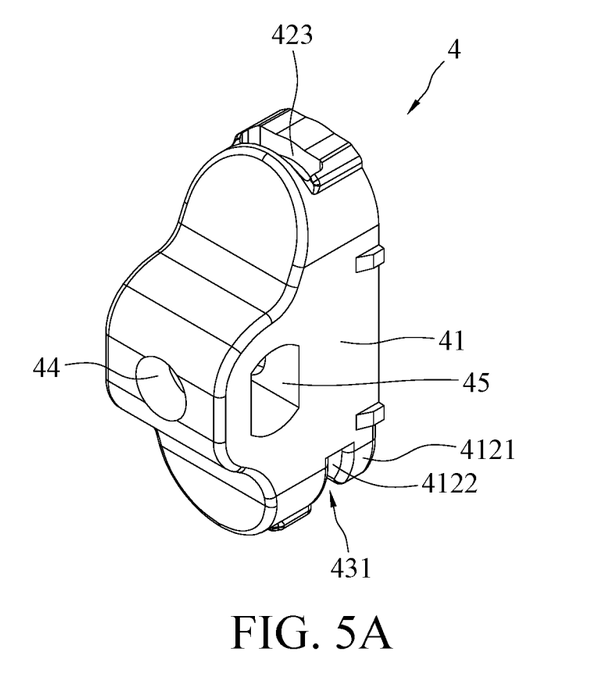
FIGS. 5A and 5B are respectively schematic enlarged views of different viewing angles of a first pre-component of the supporting device according to the present disclosure.
Figure 5B:
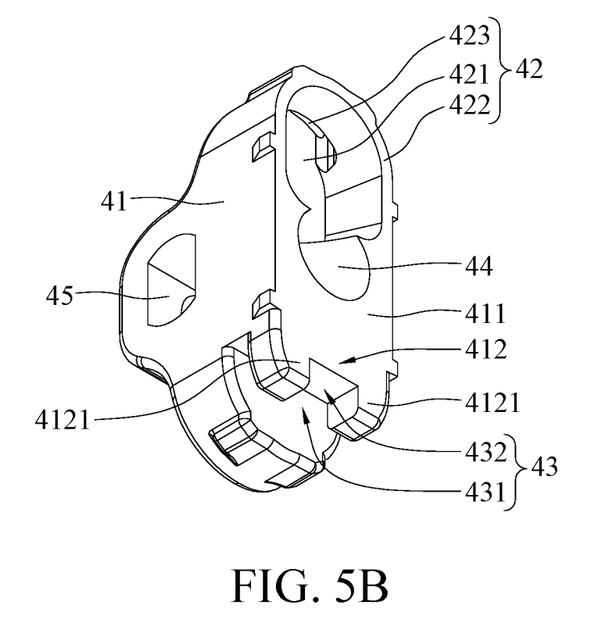

Please refer to FIGS. 5A and 5B. The first pre-component 4 includes a body 41, a hanging ear 42, a slot 43, a through hole 44 and a fixing hole 45. The body 41 and the hanging ear 42 are integrally formed, but it is not limited to this. The body 41 has an abutting surface 411 and a buckling block 412. The abutting surface 411 is substantially a plane. The buckling block 412 has two protrusions 4121 and a stop inner surface 4122, and the buckling block 412 has an inverted U-shaped cross-section. The hanging ear 42 has an ear groove 421, an ear pinna 422, and a positioning groove 423. The ear pinna 422 surrounds and defines the ear groove 421. The positioning groove 423 is formed on the ear pinna 422 and intercommunicates with the ear groove 421, wherein penetrating directions of the ear groove 421 and the positioning groove 423 are different and approximately perpendicular to each other. The ear pinna 422 is connected to one end of the body 41, and the slot 43 is formed at the other end of the body 41 and is spaced apart from the ear groove 421. The slot 43 has a main slot body 431 and an extended slot body 432 intercommunicated with each other. The main slot body 431 is formed in the body 41, the extended slot body 432 is located between the two protrusions 4121, and the stop inner surface 4122 actually faces the main slot body 431, wherein the main slot body 431 may be larger than the extended slot body 432. The through hole 44 penetrates the body 41 and allows the screw rod 312 to penetrate therethrough. The fixing hole 45 penetrates the body 41 and intercommunicates with the through hole 44 for the rod member 34 to pass through, such that the first pre-component 4 is disposed on the carrying board unit 3.

Figure 6:
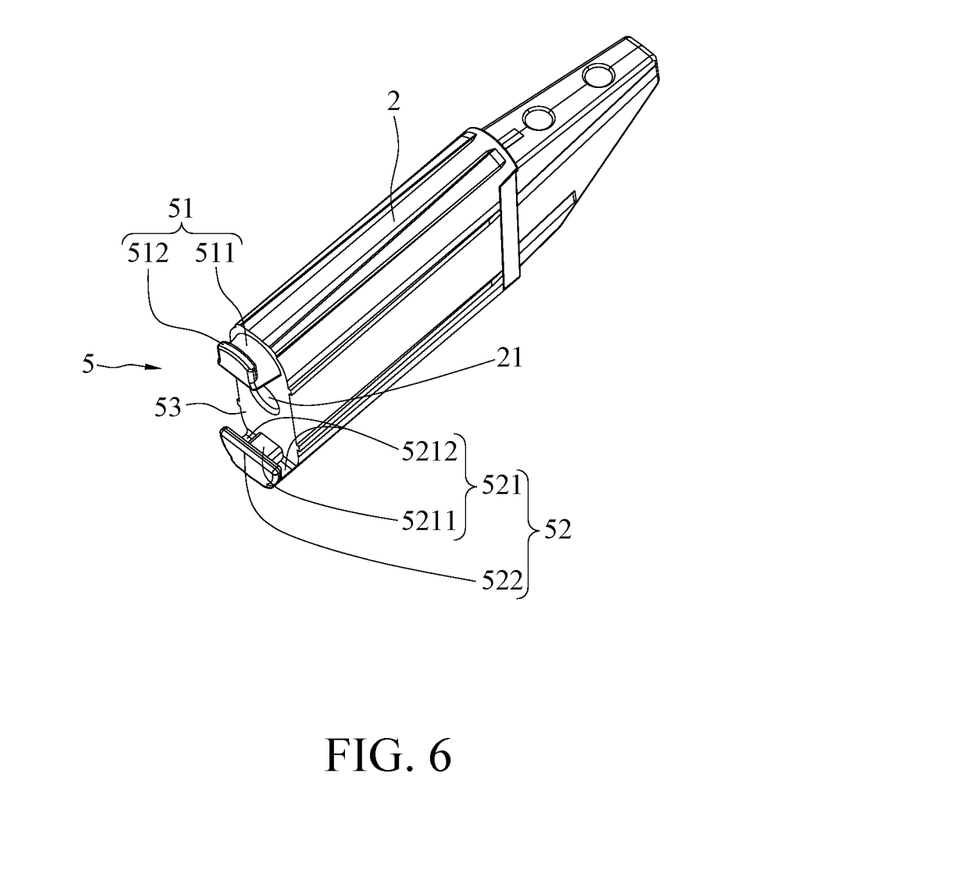
FIG. 6 is a schematic enlarged view of a protruding neck and a second pre-component of the supporting device according to the present disclosure.

Please refer to FIG. 6, the second pre-component 5 is disposed on the protruding neck 2, and the second pre-component 5 includes a hanging hook 51, a snap hook 52 and a contacting surface 53, wherein the hanging hook 51 and the snap hook 52 are arranged on the contacting surface 53 at intervals. The hanging hook 51 has an extension portion 511 and a hook portion 512, the extension portion 511 and the hook portion 512 are angularly connected to each other, and the snap hook 52 has an extension section 521 and a hook section 522 that are connected to each other. The extension section 521 has an inverted T-shaped cross-section and has a convex rib 5211 and two wing plates 5212. The wing plates 5212 respectively extend from the convex rib 5211 outward roughly along the second axis X2. The contacting surface 53 is substantially a flat surface.

The second pre-component 5 is removably matched with and connected to the first pre-component 4, and the first pre-component 4 and the second pre-component 5 are hung on each other by gravity. Please refer to FIG. 7 at the same time. When the first pre-component 4 and the second pre-component 5 are matched and connected, the positioning groove 423 extends substantially along the gravity direction G, the ear groove 421 and the extension portion 511 substantially extend along the first axis X1, the main slot body 431 extends along the gravity direction G, the through hole 44 extends along the first axis X1, the fixing hole 45 extends along the second axis X2 and intercommunicates with the through hole 44, the hook portion 512 is connected to the extension portion 511 and substantially extends along the gravity direction G, the hanging hook 51 and the snap hook 52 are arranged along the gravity direction G, and the ear groove 421 and the slot 43 are arranged along the gravity direction G. At this time, the extension portion 511 is accommodated in the ear groove 421, the hook portion 512 is accommodated in the positioning groove 423, and the snap hook 52 is accommodated in the slot 43 and is engaged with the body 41. In specific, the convex rib 5211 of the extension section 521 is accommodated in the extended slot body 432 of the slot 43 and is located between the two protrusions 4121, and the two wing plates 5212 respectively and correspondingly abut against the two protrusions 4121, and the hook section 522 extends into the main groove body 431 and abuts against the inner stop surface 4122 of the buckling block 412, and the abutting surface 411 and the contacting surface 53 are attached to each other. A volume of the convex rib 5211 can be equivalent to a volume of the extended groove body 432, a volume of the hook section 522 can be equivalent to a volume of the main slot body 431, such that the slot 43 and the snap hook 52 can be closely matched. After the first pre-component 4 and the second pre-component 5 are hung on each other, the screw rod 312 can be screwed into the screw hole 21 of the protruding neck 2 by passing through the penetrating hole 341 of the rod member 34 and the through hole 44 of the first pre-component 4, and the screw head 311 abuts against the body 41 of the first pre-component 4, such that the carrying board unit 3 is fixed to the protruding neck 2. On the contrary, as long as the screw rod 312 is withdrawn from the screw hole 21, the through hole 44 and the penetrating hole 341, the carrying board unit 3 is only hung on the protruding neck 2 by gravity. At this time, the user can easily detach the carrying board unit 3 from the protruding neck 2 only along a direction opposite to the gravity direction G.

Figure 7:
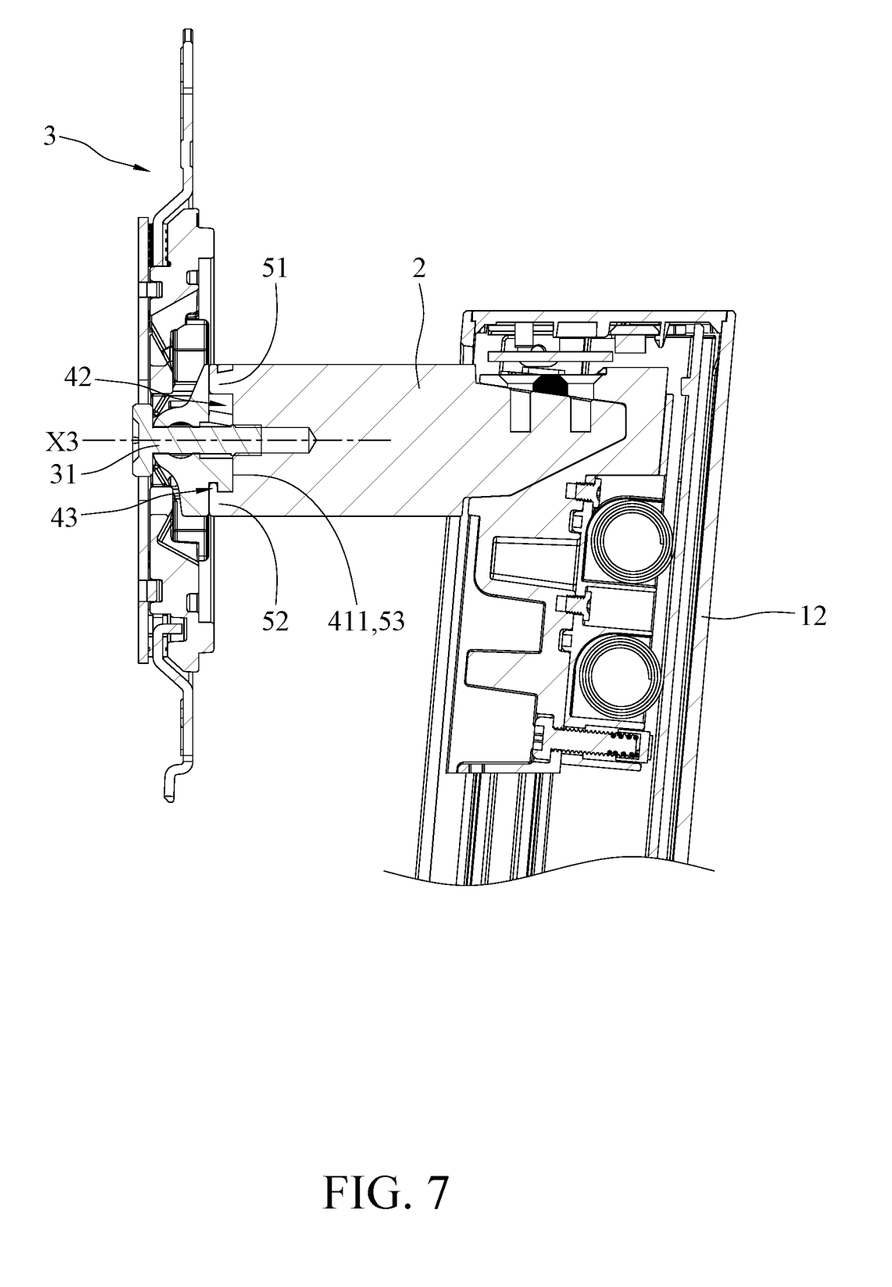
FIG. 7 is a schematic partial cross-sectional view of the supporting device according to the present disclosure.

Continuing, when the first pre-component 4 and the second pre-component 5 are matched and connected and the quick-release fixing member 31 is fixed to the protruding neck 2, the carrying board 32 can rotate relative to the column 12 about a third axis X3, as a result, the display 2000 can be switched between a portrait position and a landscape position. The carrying board 32 can also be tilted relative to the column 12 about the second axis X2 by the tilting module 33 to change an inclination angle of the display 2000. In the embodiment, when the carrying board 32 is parallel to the gravity direction G (as shown in FIG. 7), the first axis X1 and the third axis X3 coincide.

Figure 8:
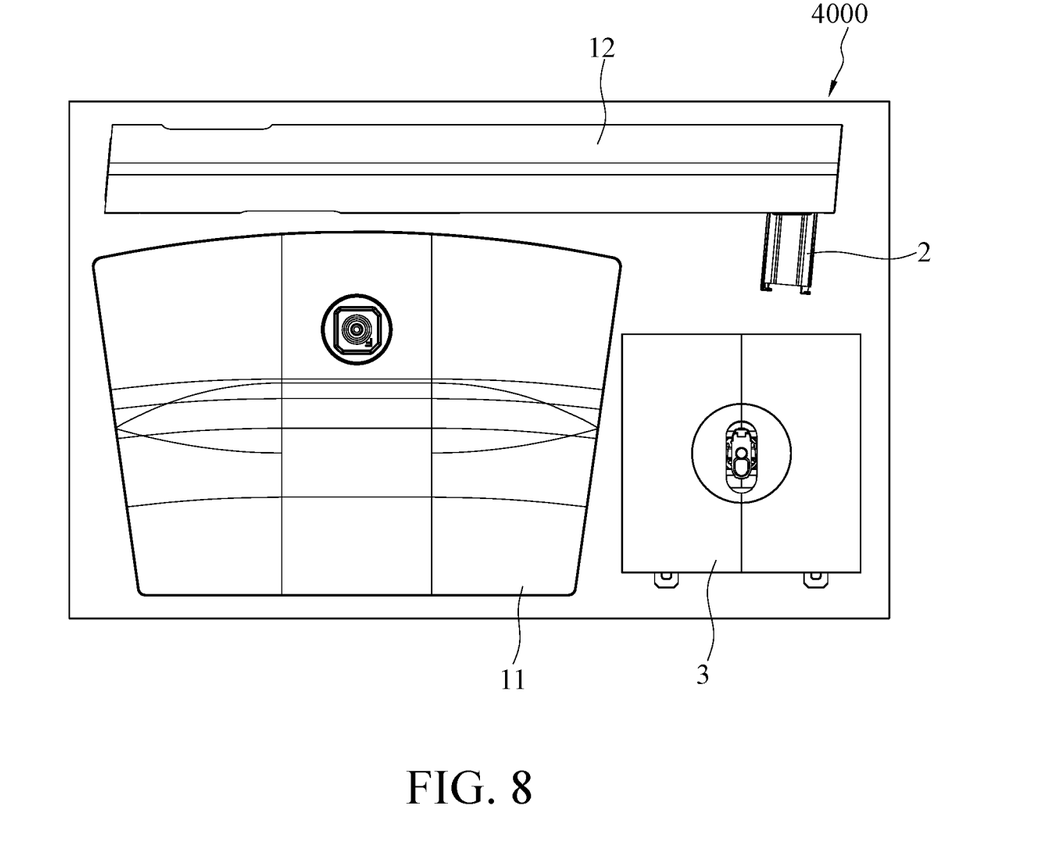
FIG. 8 is a schematic top view of each element of the supporting device being detached from each other and placed on a lower layer of a packaging material according to the present disclosure.
Figure 9:
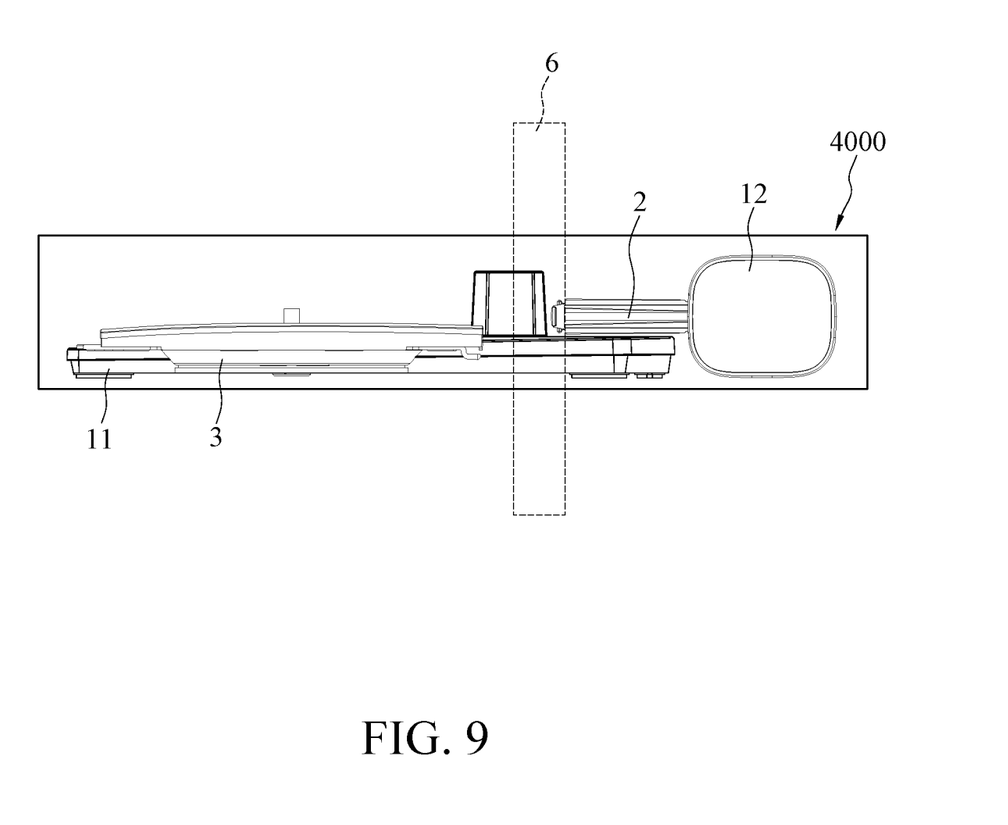
FIG. 9 is a schematic side view of each element of the supporting device being detached from each other and placed on the lower layer of the packaging material according to the present disclosure.

Since the supporting device 1000 and the display 2000 are shipped together, they are placed in the same packaging material 4000 (for example, a packaging box). Generally, the display 2000 is placed on an upper layer of the packaging material 4000, and other elements are detached from each other and placed on a lower layer of the packaging material 4000. For example, please refer to the schematic views shown in FIGS. 8 and 9 (with different angles) where the elements are detached from each other and placed on the lower layer of the packaging material 4000. Since the carrying board unit 3 according to the present disclosure can be detached from the protruding neck 2, the carrying board unit 3 can be placed next to the chassis 11, that is, the remaining space of the packaging material 4000 between the chassis 11 and the column 12 is fully utilized, and the volume of the packaging material 4000 is effectively reduced. However, in the conventional supporting device, because the carrying board unit cannot be disassembled from the protruding neck (as shown by a dotted line 6 in FIG. 9, the space range of the packaging material occupied by the carrying board unit fixed on the protruding neck), the packaging material of the conventional supporting device cannot be effectively reduced in the height direction. In addition, the packaging material generates a lot of remaining space, and the volume of the packaging material occupied may be more than twice, which makes the utilization of the internal space of the packaging material be poor and causes the cost of the packaging material to increase.

The above embodiment is described in a manner that the first pre-component 4 is disposed on the carrying board unit 3 and the second pre-component 5 is disposed on the protruding neck 2. However, the first pre-component 4 may also be disposed on the protruding neck 2, and the second pre-component 5 may be disposed on the carrying board unit 3, and the present disclosure is not limited to this. In addition, the slot 43 of the first pre-component 4 and the snap hook 52 of the second pre-component 5 can additionally provide foolproof and positioning functions, which facilitates an installation work of the user. However, in other embodiments, the first pre-component 4 may only have the body 41 and the hanging ear 42, and the second pre-component 5 may only have the hanging hook 51. That is, omitting the slot 43 of the first pre-component 4 and the snap hook 52 of the second pre-component 5, the supporting device 1000 according to the present disclosure can still maintain a function of the first pre-component 4 and the second pre-component 5 being gravitationally hung on each other.

In summary, the carrying board unit in the supporting device according to the present disclosure can be quickly and detachably arranged on the protruding neck, and can be separated from each other when shipped, and can effectively reduce the volume and cost of packaging materials. In addition, the structural design of the first pre-component and the second pre-component in the supporting device according to the present disclosure that are matched with each other and hung on each other by gravity, in addition to having a foolproof effect, is more conducive to installation by users.

What is claimed is:

1. A supporting device for carrying a display on a working surface, the supporting device comprising:
    a support upright disposed on the working surface and including a column and an opening, wherein the column substantially extends along a gravity direction, and the opening is formed on the column;
    a protruding neck disposed on the column and partially extending from the opening along a first axis;
    a carrying board unit being able to be detachably arranged on the protruding neck and used for carrying the display, wherein the carrying board unit includes a quick-release fixing member being able to be fixed on the protruding neck;
    a first component disposed on one of the protruding neck and the carrying board unit; and
    a second component disposed on the other one of the protruding neck and the carrying board unit and able to be removably matched with and connected to the first component;
    wherein the first component includes a hanging ear, the second component includes a hanging hook, and the hanging ear is able to be hung on the hanging hook;
    wherein the hanging ear has an ear groove and an ear pinna, and the ear pinna surrounds and defines the ear groove;
    wherein the hanging ear further has a positioning groove formed on the ear pinna and intercommunicating with the ear groove, wherein the hanging hook has an extension portion and a hook portion, and wherein when the first component and the second component are matched and connected, the extension portion is accommodated in the ear groove, and the hook portion is accommodated in the positioning groove.

2. The supporting device of claim 1, wherein the first component and the second component are hung on each other by gravity.

3. The supporting device of claim 2, wherein the first component further includes a slot and a body, one end of the body is connected to the ear pinna, and the slot is formed at the other end of the body, and wherein the second component further includes a snap hook being able to be accommodated in the slot and engaged with the body.

4. The supporting device of claim 3, wherein when the first component and the second component are matched and connected, the positioning groove extends substantially along the gravity direction, the ear groove and the extension portion substantially extend along the first axis, and the hook portion is connected to the extension portion and extends substantially along the gravity direction.

5. The supporting device of claim 4, wherein the body has an abutting surface, and the second component further includes a contacting surface, and wherein when the first component and the second component are matched and connected, the abutting surface and the contacting surface are attached.

6. The supporting device of claim 5, wherein the hanging hook and the snap hook are disposed on the contacting surface at intervals, and the ear groove and the slot are disposed at intervals, and wherein when the first component and the second component are matched and connected, the hanging hook and the snap hook are arranged along the gravity direction, and the ear groove and the slot are arranged along the gravity direction.

7. The supporting device of claim 6, wherein the body further has a buckling block, wherein the snap hook has an extension section and a hook section connected to each other, and wherein the extension section is able to be accommodated in the slot, and the hook section is able to be buckled with the buckling block.

8. The supporting device of claim 7, wherein the slot has a main slot body and an extended slot body intercommunicated with each other, and wherein the main slot body is formed on the body along the gravity direction, the extension section is able to be accommodated in the extended slot body, and the hook section is able to extend into the main slot body and abut against the buckling block.

9. The supporting device of claim 8, wherein the buckling block has two protrusions and a stop inner surface, the extension section has a convex rib and two wing plates, the wing plates respectively extend outward from the convex rib, and wherein when the first component and the second component are matched and connected, the hook section abuts against the stop inner surface, the convex rib is accommodated in the extended slot body and located between the protrusions, and the wing plates respectively and correspondingly abut against the protrusions.

10. The supporting device of claim 9, wherein the buckling block has an inverted U-shaped cross-section, and the extension section has an inverted T-shaped cross-section.

11. A supporting device for carrying a display on a working surface, the supporting device comprising:
    a support upright disposed on the working surface and including a column and an opening, wherein the column substantially extends along a gravity direction, and the opening is formed on the column;
    a protruding neck disposed on the column and partially extending from the opening along a first axis;
    a carrying board unit being able to be detachably arranged on the protruding neck and used for carrying the display, wherein the carrying board unit includes a quick-release fixing member being able to be fixed on the protruding neck;

a first component disposed on one of the protruding neck and the carrying board unit; and a second component disposed on the other one of the protruding neck and the carrying board unit and able to be removably matched with and connected to the first component;

wherein the quick-release fixing member includes a screw head and a screw rod connected to each other, wherein the protruding neck has a screw hole, the first component further includes a through hole extending along the first axis, and wherein when the first component and the second component are matched and connected, the screw rod is able to be screwed into the screw hole by passing through the carrying board unit and the through hole, and the screw head abuts against the first component, such that the carrying board unit is able to be quickly and detachably arranged on the protruding neck; wherein the carrying board unit includes a rod member arranged along a second axis perpendicular to the gravity direction and the first axis, wherein the rod member has a penetrating hole penetrating along the first axis, intercommunicating with the through hole and allowing the screw rod to pass through, and wherein the first component further includes a fixing hole extending along the second axis, intercommunicating with the through hole and allowing the rod member to pass through.

12. The supporting device of claim 11, wherein the carrying board unit further includes a carrying board and a tilting module, wherein the carrying board is used to connect to the display and has an accommodating space, and the rod member and the tilting module are arranged in the accommodating space, and wherein when the first component and the second component are matched and connected and when the quick-release fixing member is fixed to the protruding neck, the carrying board is able to rotate relative to the column about a third axis, the display is able to be switched between a portrait position and a landscape position, and the carrying board is also able to be tilted relative to the column about the second axis and change an inclination angle of the display.

13. The supporting device of claim 12, wherein the first component and the second component are hung on each other by gravity.

14. The supporting device of claim 13, wherein the first component includes a hanging ear, the second component includes a hanging hook, and the hanging ear is able to be hung on the hanging hook, and wherein the hanging ear has an ear groove and an ear pinna, and the ear pinna surrounds and defines the ear groove.

15. The supporting device of claim 14, wherein the hanging ear further has a positioning groove formed on the ear pinna and intercommunicating with the ear groove, wherein the hanging hook has an extension portion and a hook portion, and wherein when the first component and the second component are matched and connected, the extension portion is accommodated in the ear groove, and the hook portion is accommodated in the positioning groove.

16. The supporting device of claim 15, wherein the first component further includes a slot and a body, one end of the body is connected to the ear pinna, and the slot is formed at the other end of the body, wherein the second component further includes a snap hook being able to be accommodated in the slot and engaged with the body, and wherein when the first component and the second component are matched and connected, the positioning groove extends substantially along the gravity direction, the ear groove and the extension portion substantially extend along the first axis, and the hook portion is connected to the extension portion and extends substantially along the gravity direction.

17. The supporting device of claim 16, wherein the body has an abutting surface, and the second component further includes a contacting surface, wherein when the first component and the second component are matched and connected, the abutting surface and the contacting surface are attached, wherein the hanging hook and the snap hook are disposed on the contacting surface at intervals, and the ear groove and the slot are disposed at intervals, and wherein when the first component and the second component are matched and connected, the hanging hook and the snap hook are arranged along the gravity direction, and the ear groove and the slot are arranged along the gravity direction.

18. The supporting device of claim 17, wherein the body further has a buckling block, wherein the snap hook has an extension section and a hook section connected to each other, wherein the extension section is able to be accommodated in the slot, and the hook section is able to be buckled with the buckling block, wherein the slot has a main slot body and an extended slot body intercommunicated with each other, and wherein the main slot body is formed on the body along the gravity direction, the extension section is able to be accommodated in the extended slot body, and the hook section is able to extend into the main slot body and abut against the buckling block.

19. The supporting device of claim 18, wherein the buckling block has two protrusions and a stop inner surface, the extension section has a convex rib and two wing plates, the wing plates respectively extend outward from the convex rib, wherein when the first component and the second component are matched and connected, the hook section abuts against the stop inner surface, the convex rib is accommodated in the extended slot body and located between the protrusions, and the wing plates respectively and correspondingly abut against the protrusions, and wherein the buckling block has an inverted U-shaped cross-section, and the extension section has an inverted T-shaped cross-section.

* * * * *